United States Patent
Hohnl et al.

[19]

[11] Patent Number: 6,065,276
[45] Date of Patent: May 23, 2000

[54] MULCHING MOWER DECK

[75] Inventors: Gary David Hohnl, Slinger; Dean William Benter, Horicon, both of Wis.

[73] Assignee: Deere & Company, Moline, Ill.

[21] Appl. No.: 08/789,226

[22] Filed: Jan. 24, 1997

[51] Int. Cl.[7] .................................................. A01D 67/00
[52] U.S. Cl. .................................... 56/320.1; 56/DIG. 20
[58] Field of Search ............................... 56/320.1, 320.2, 56/12.4, 255, 295, DIG. 17, DIG. 20, DIG. 22, DIG. 24, 6

[56] References Cited

U.S. PATENT DOCUMENTS

| | | | |
|---|---|---|---|
| 2,815,634 | 12/1957 | Bush | 56/25.4 |
| 3,028,719 | 4/1962 | Jepson . | |
| 4,055,036 | 10/1977 | Kidd | 56/320.2 |
| 4,205,512 | 6/1980 | Throud | 56/13.4 |
| 4,226,074 | 10/1980 | Mullet et al. | 56/320.2 |
| 4,707,971 | 11/1987 | Forpahl et al. | 56/6 |
| 4,856,265 | 8/1989 | Wolf | 56/320.2 |
| 4,869,054 | 9/1989 | Hostetler et al. | 56/6 |
| 4,887,420 | 12/1989 | Cerny, Jr. et al. | 56/320.2 |
| 4,938,011 | 7/1990 | Pernia | 56/255 |
| 4,958,484 | 9/1990 | Busboom | 56/255 |
| 5,035,108 | 7/1991 | Meyer et al. | 56/320.2 |
| 5,070,683 | 12/1991 | Eggenmueller | 56/13.8 |
| 5,129,217 | 7/1992 | Loehr | 56/13.6 |
| 5,133,176 | 7/1992 | Baumann et al. | 56/17.4 |
| 5,161,353 | 11/1992 | Bergkamp | 56/6 |
| 5,205,112 | 4/1993 | Tillotson et al. | 56/2 |
| 5,212,938 | 5/1993 | Zenner | 56/320.1 |
| 5,214,906 | 6/1993 | Saki et al. | 56/320.2 |
| 5,251,430 | 10/1993 | Matsumoto et al. | 56/320.2 |
| 5,267,429 | 12/1993 | Kettler | 56/295 |
| 5,390,480 | 2/1995 | Simonson et al. | 56/320.2 |
| 5,410,867 | 5/1995 | Plamper et al. | 56/320.2 |
| 5,483,790 | 1/1996 | Kuhn et al. | 56/17.5 |
| 5,761,891 | 6/1998 | Ferrari | 56/6 |

FOREIGN PATENT DOCUMENTS

| | | |
|---|---|---|
| 0 367 027 | 10/1989 | European Pat. Off. . |
| 0 532 068 | 3/1993 | European Pat. Off. . |
| 0 763 319 | 3/1997 | European Pat. Off. . |
| 0 642 730 | 9/1999 | European Pat. Off. . |

OTHER PUBLICATIONS

Brochure published by a company known as Castlegarden, entitled "Trattorino Aufsitzmaher 12,5—14 HP, USO E Manutenzione Gebrauch Und Vartung", 14 pages, published in Italy prior to 1996.

Brochure published by Troy–bilt, entitled "Troy–bilt Tractors", 12 pages, publication date unknown, published in the U.S.A.

Sales Manual published by Deere & Co., pages for "GS30, GS45 and GS75 Commercial Walk–Behind Mowers", pp. C10–200–1 and C10–200–5, published in the U.S.A. prior to 1996.

*Primary Examiner*—David Bagnell
*Assistant Examiner*—Ardad Fabian Kovacs

[57] ABSTRACT

A mulching mower deck within which first and second mower blades rotate for cutting grass, having first and second blade chambers positioned adjacent each other and within which respective blades rotate during operation. The first and second blade chambers are generally completely enclosed for generally confining grass clippings within the blade chambers for preventing the clippings from exiting through side or top walls of the mower deck. The first and second blades travel in respective paths which overlap. The first blade is positioned to the right of the second blade with respect to forward operation of the mower deck and travels in a clockwise direction, and the second blade is positioned to the left of the first blade and travels in a counterclockwise direction. An opening is formed between the first and second blade chambers at a location where the blade paths overlap. Edges of the opening are positioned relatively close to the first and second blades near where the blade paths overlap. A flow divider defines the opening and is positioned generally above the location where the blade paths overlap, and extends downwardly from the top wall of the mower deck to a position in relatively close vertical proximity to the rotating blades where the blade paths overlap. The flow divider includes a portion directly in front of where the blade paths overlap, which acts to divide and direct air and clippings to respective blade chambers.

21 Claims, 8 Drawing Sheets

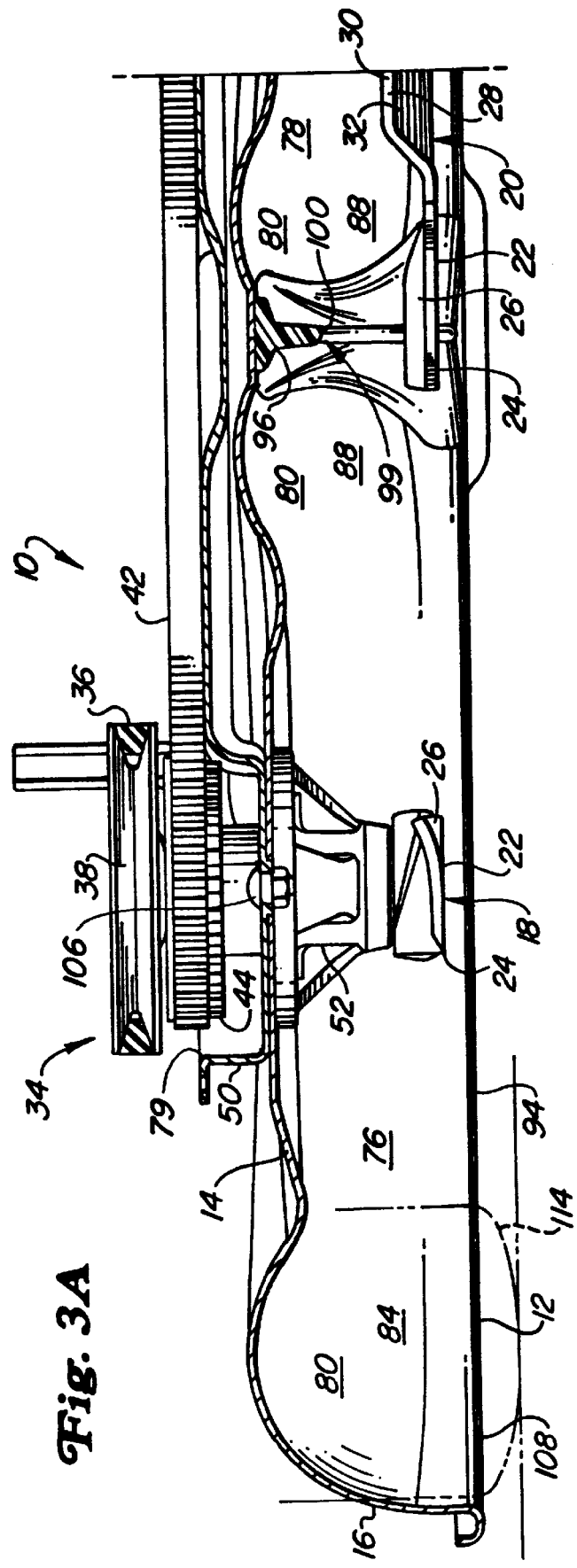

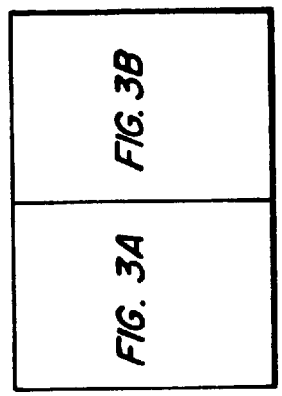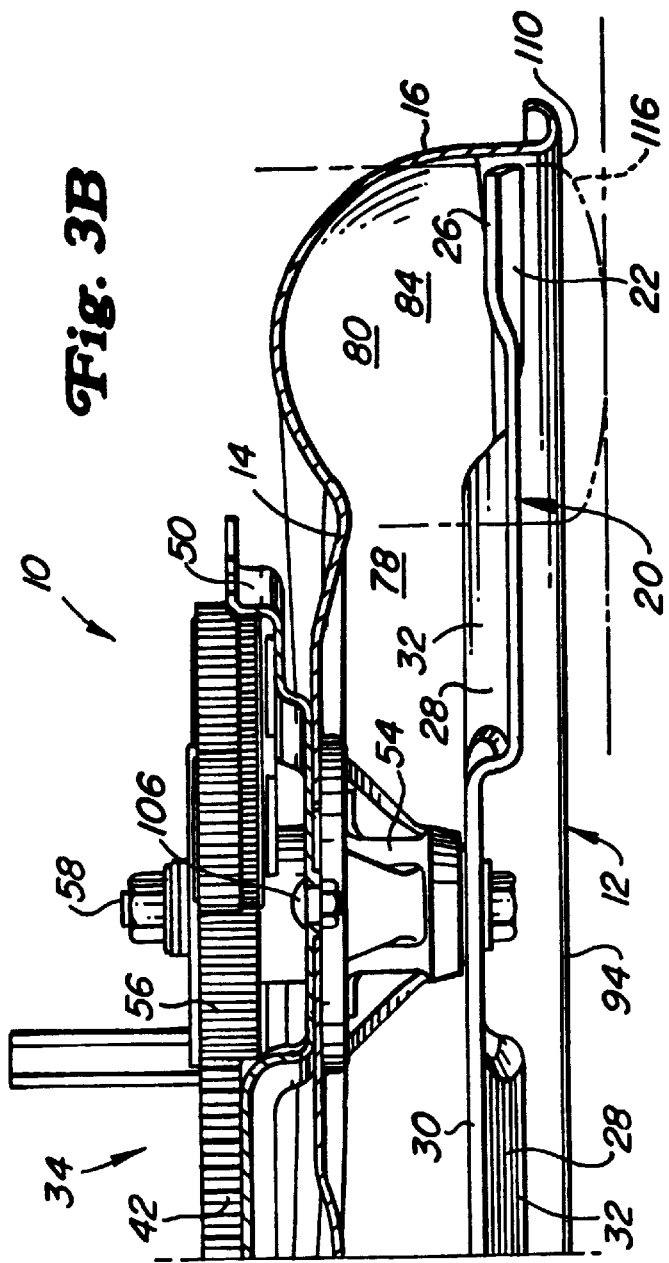

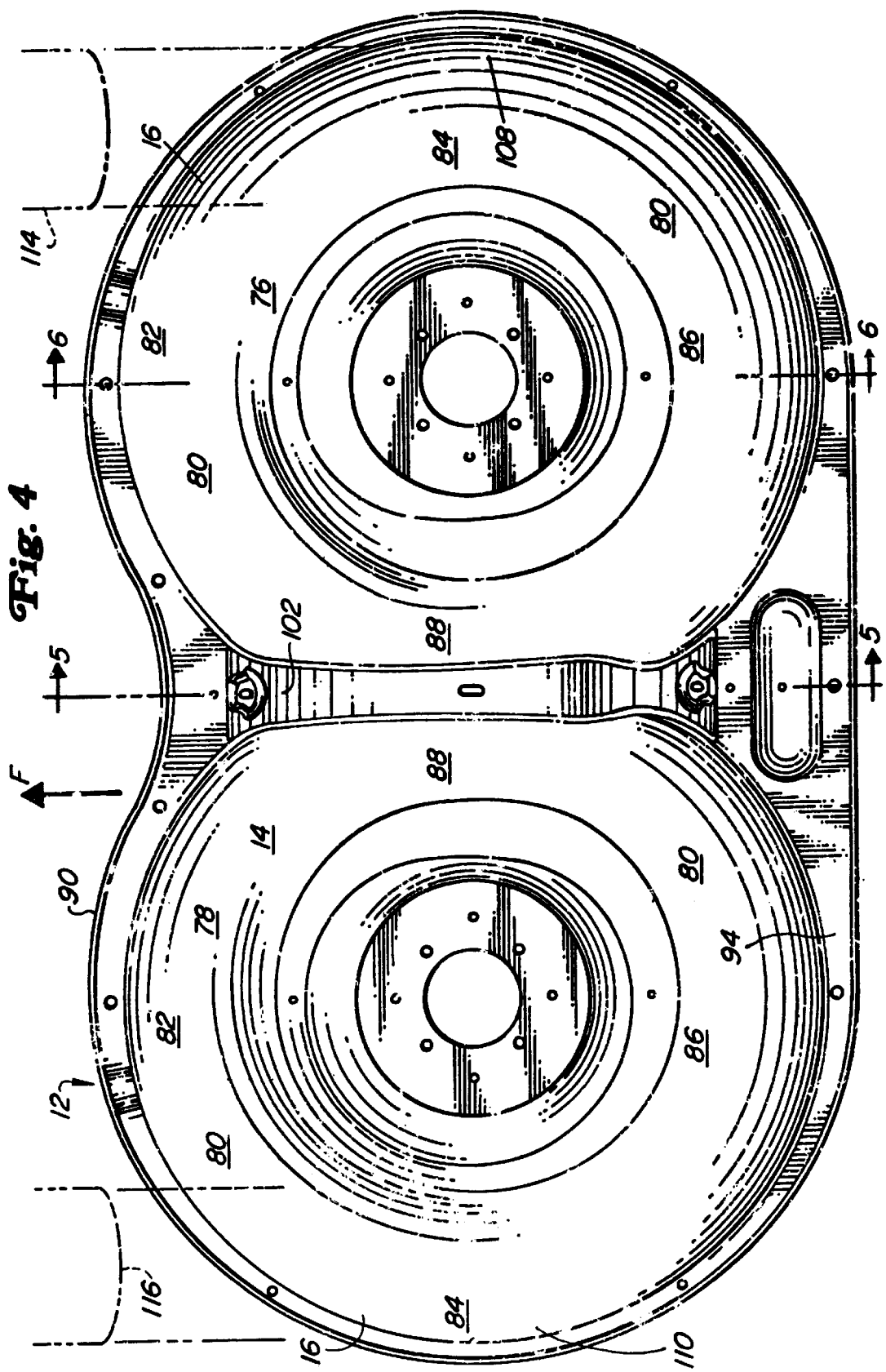

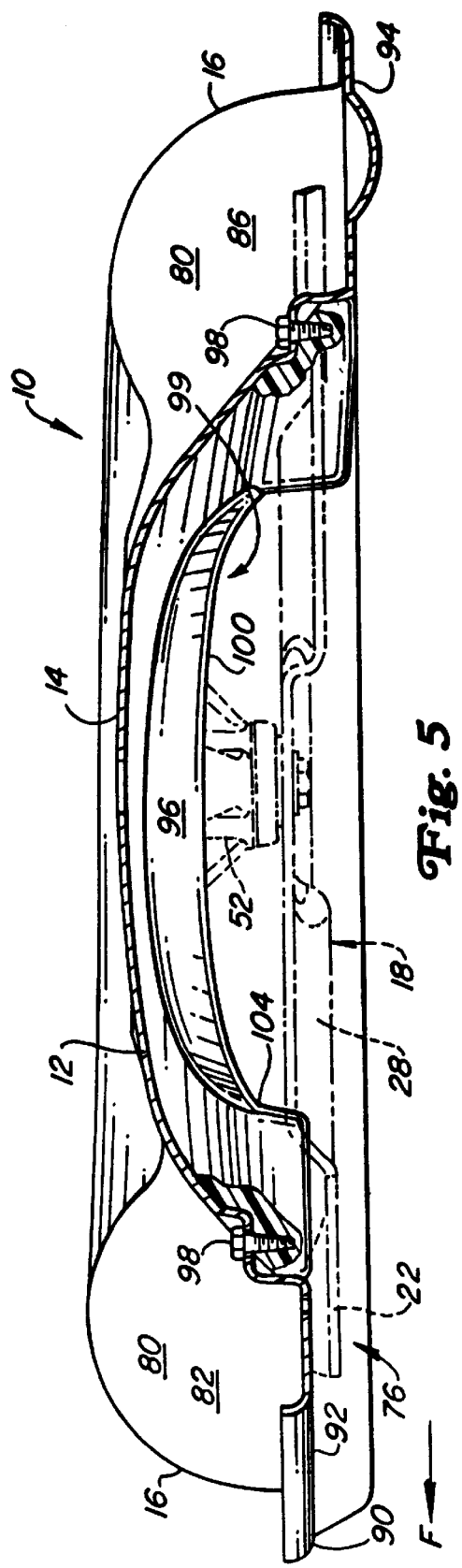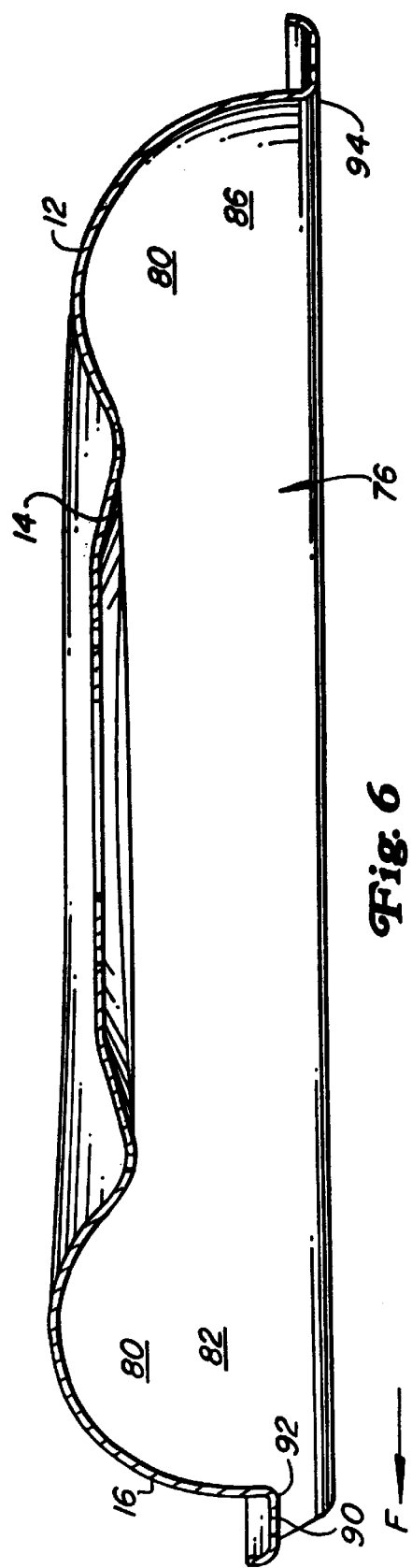

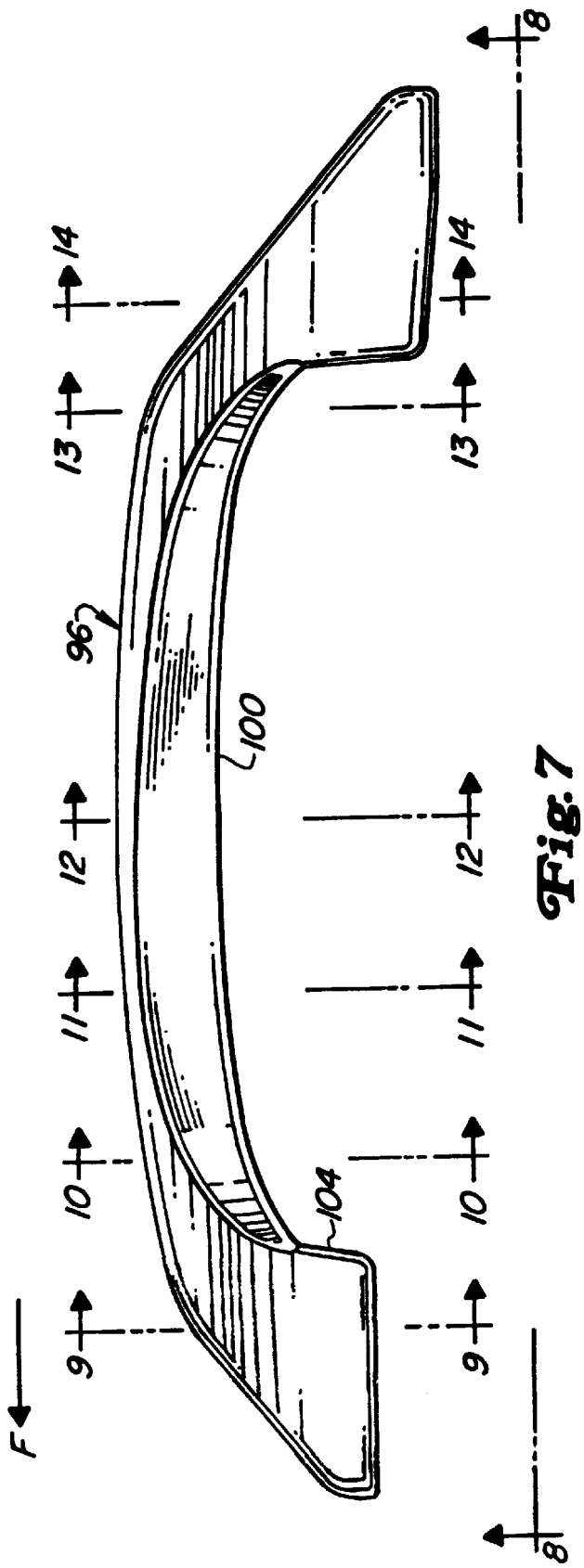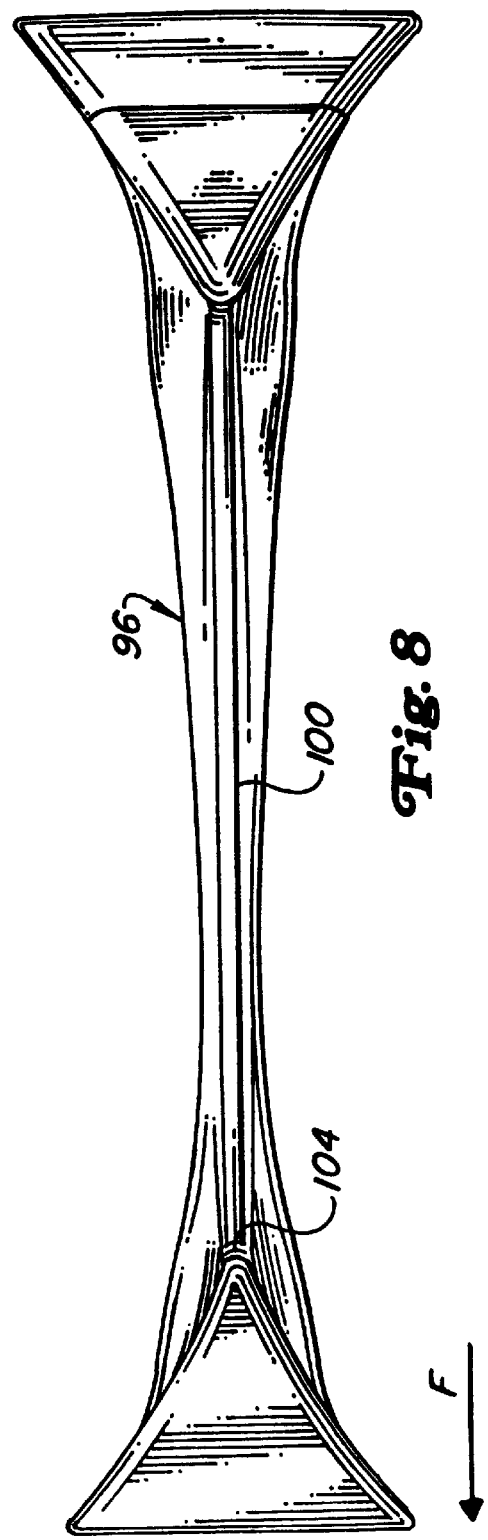

MULCHING MOWER DECK

BACKGROUND OF THE INVENTION

Conventional walk behind mulching mowers provide a blade which rotates within an enclosed cutting chamber. Since the cutting chamber or deck is generally completely enclosed, the grass clippings cut by the rotating blade are confined within the chamber and recirculate for being recut by the cutting blade into fine particles or mulch. The finely mulched clippings are then directed down into the turf where they are generally hidden from view and are beneficial as nutrients for the turf grasses. Mulching blades are often utilized which have outer cutting edges for cutting the growing grass and inner mulching edges which recut the grass clippings circulating within the chamber. Walk-behind mulching mowers typically provide a single blade and a single shroud or cutting chamber which surrounds the blade.

Some walk behind mulching mowers provide deflectors which are mounted to the interior walls of the cutting chambers. These deflectors are intended to deflect air and clippings downwardly so that the mulched clippings will be deposited in the turf. Grass clippings can tend to stick or adhere to the deflectors which can create clogging within the chamber. This clogging can slow the flow of materials within the deck, which can increase the horsepower required to drive the blades within the chamber. This clogging can be especially acute when operating the mulching mower in wet conditions.

Wide area mulching mowers typically include a mower deck to which several spindles and blades are mounted. The blades are typically offset from one another so that grass between the blades is mowed completely. Uncut strips of grass between the blades are thereby eliminated. Wide area mulching mowers typically provide each blade with its own shroud for confining clippings to that particular blade. Some conventional mulchers do not properly disperse the mulched clippings into the turf and leave unsightly windrows or clumps of clippings on the lawn. Also, some mulchers act to suspend clippings within the chamber with such force that the clippings are not allowed to drop into the turf, which can clog the cutting chamber and cause poor cut quality. This can also cause large clumps of clippings to fall from the deck when the mower is stopped.

One type of wide area mulching mower provides a pair of cutting blades which rotate in the same direction and in paths which overlap slightly. This type of deck is completely enclosed and does not include a discharge outlet through which clippings can flow. With no discharge outlet to flow through, the clippings tend to wad up within the cutting chambers. Heavy wads of clippings are difficult for the blades to suspend within the chambers, and create resistance to the blades as they rotate within the chambers. This type of mulching mower therefore consumes a large amount of horsepower to drive the blades within the chambers.

Many conventional mulching mowers do not provide enough vacuum effect to lift grass before cutting. This problem is particularly acute in the path of the tire where the contact of the tire against the turf tends to flatten the grass against the ground in front of the mulching deck. Many conventional mulching mowers do not adequately lift the grass that has been flattened by the tire, which results in poor cut quality.

One type of conventional mower that is non-mulching mounts to the belly of a lawn tractor and discharges clippings rearwardly along the centerline of the vehicle. This type of mower deck includes a pair of mower blades which rotate in opposite directions. The blade on the right rotates counterclockwise and the blade on the left rotates clockwise. Grass is cut at the front of the mower deck, and the clippings are then directed to the middle of the deck where they are blown upwardly and to the rear through a discharge outlet formed in the mower deck. A chute then channels these clippings to a bag or container mounted to the rear of the lawn tractor. Many of these mowers provide blades which rotate in paths which overlap. A timing mechanism, such as a toothed belt, is typically utilized for driving the blades so that they do not strike each other within the mower housing where their paths overlap. Since the blade paths overlap, the blades will completely cut the grass between the blades without leaving an uncut strip of grass, and therefore the blades do not have to be offset or staggered in order to cut the grass between the blades. This type of mower positions the blades directly to the side of each other which allows the operator to easily maneuver the vehicle in both directions and facilitates mowing close to objects on either side of the mower and during turns in either direction. By aligning the blades directly to the side of one another the mower deck is relatively compact from front to rear and therefore fits well between the front and rear tires of even small lawn tractors. This type of mower does not mulch grass clippings and therefore requires the operator to dispose of clippings by other means such as bagging.

It would therefore be desirable to provide a wide area mulching mower which effectively cuts grass and mulches clippings even in wet conditions, and which evenly distributes recut clippings into the turf without clumping or windrowing. It would be desirable for such a mower to demand relatively low horsepower from the mower's power source. It would be desirable for such a mower to allow for trimming on either side of the deck and to facilitate maneuverability of the vehicle. It would also be desirable for such a mechanism to be compact for use with relatively small lawn tractors and vehicles. It would be desirable for such a mower to effectively lift grass that has been trampled or flattened by vehicle tires in front of the mower deck so that cut quality is enhanced.

SUMMARY OF THE INVENTION

The present invention provides a mulching mower mechanism having a deck within which first and second mower blades rotate for cutting and mulching grass. First and second mulching mower blades include an outer cutting portion having a trailing upturned wing and an inner mulching portion having a trailing downturned wing. First and second blade chambers are positioned adjacent each other and house the respective first and second blades during operation. First and second blade chambers are generally completely enclosed for generally confining grass clippings within the respective blade chambers without allowing the clippings to exit through the side and top walls of the mower deck. The first and second blades travel in respective paths which overlap by approximately two inches. The first blade is positioned to the right of the second blade with respect to forward operation of the mower deck and travels in a clockwise direction, and the second blade is positioned to the left of the first blade and rotates in a counterclockwise direction. An opening is formed between the first and second blade chambers at a location where the blade paths overlap. Edges of said opening are positioned relatively close to the first and second blades near where the blade paths overlap. A flow divider defines these edges and is positioned generally above the location where the blade paths overlap, and extends downwardly from the top wall of the mower deck to a position in relatively close vertical proximity to the rotating blades in the location where the blade paths overlap. The flow divider includes a portion directly in front of where the blade paths overlap, which serves to divide and direct air and clippings striking that portion to respective blade chambers.

The blade chambers each include a channel which is positioned generally above the respective blade and extends around the axis of rotation of the respective blade. The channels are relatively tall and narrow near the front portion of the deck and gradually slope down to be relatively shallow and wide near a rear portion of the deck. The deck includes a front skirt portion having a lowermost edge which is positioned higher than a lowermost edge of a rear skirt portion. The portion of the channel positioned generally between the adjacent blade chambers is positioned closer to its respective blade axis than other portions of the respective channel. Therefore, the channels, when viewed from a plan view, are D-shaped having generally flattened portions positioned adjacent each other.

The mower deck is propelled forwardly by a vehicle having left and right front wheels which engage the ground in front of the mower deck. The right wheel is generally aligned with an outer portion of the first cutting chamber whereat the first blade travels rearwardly, and the left wheel is generally aligned with an outer portion of the second cutting chamber whereat the second blade travels rearwardly.

BRIEF DESCRIPTION OF THE DRAWINGS

FIG. 2 is a schematic explaining how FIGS. 3A and 3B should be viewed together in side by side relationship.

FIG. 3A is a partial sectional view of the right rear portion of the mower deck mechanism of FIG. 1.

FIG. 3B is a partial sectional view of the left rear portion of the mower deck mechanism of FIG. 1.

FIG. 4 is a plan view of the mower deck of FIG. 1.

FIG. 5 is a partial sectional view along the center of the mower deck of FIG. 1, showing the entire flow divider in solid lines.

FIG. 6 is a sectional view of the mower deck of FIG. 4.

FIG. 7 is a side view of the flow divider.

FIG. 8 is a view from beneath the flow divider.

DETAILED DESCRIPTION OF THE PREFERRED EMBODIMENT

Figure 1:
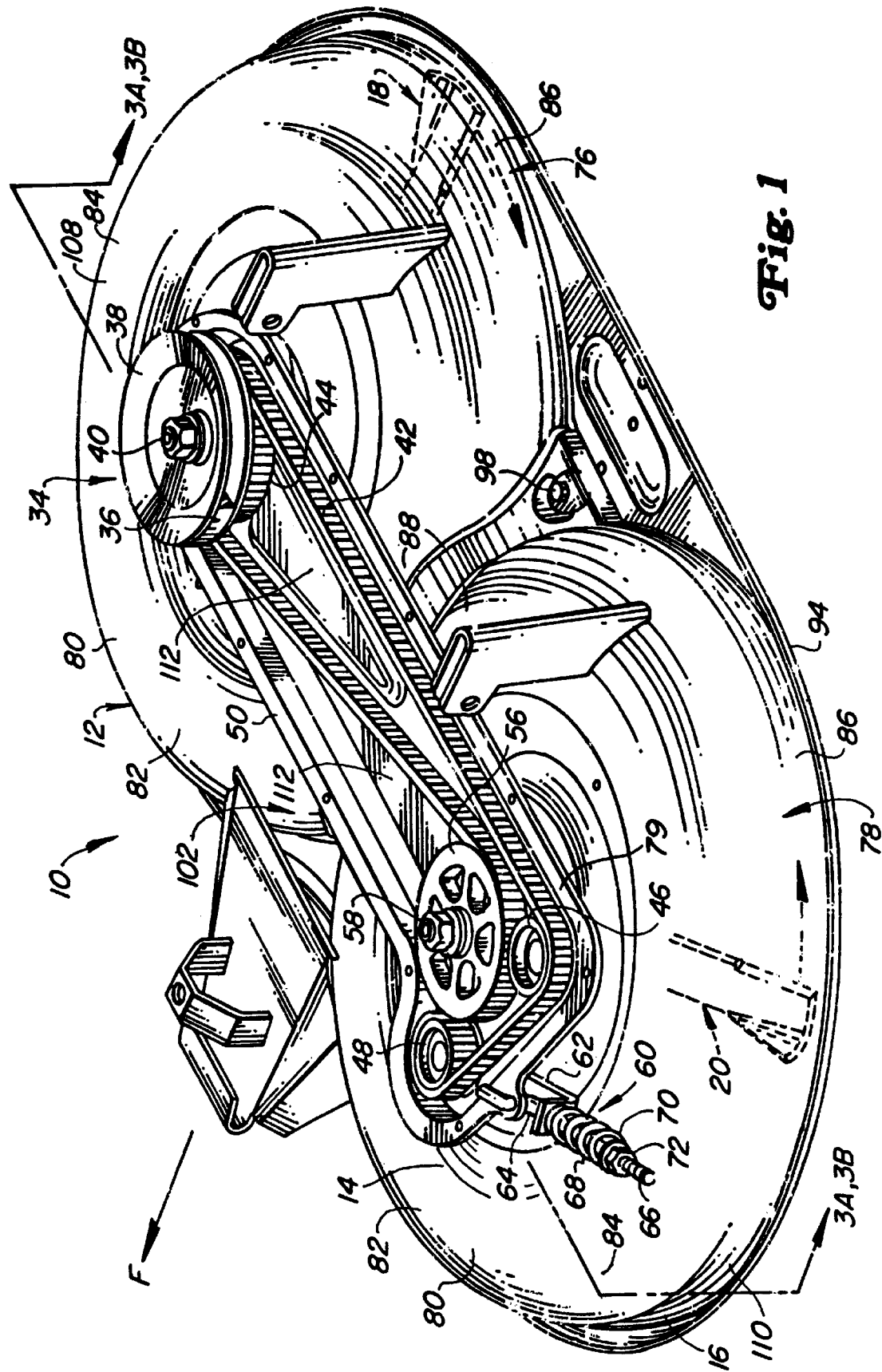
FIG. 1 is a perspective view of the mower deck and drive mechanism according to the present invention shown detached from a lawn tractor vehicle.
Figure 9:
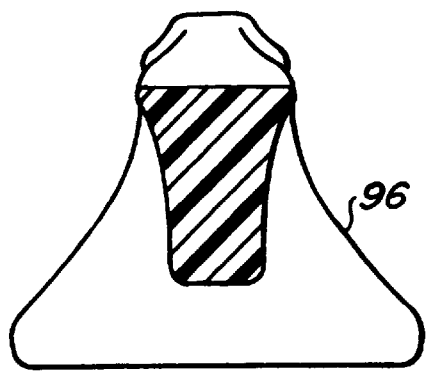
FIGS. 9–14 are sectional views of the flow divider shown in FIG. 7.
Figure 10:
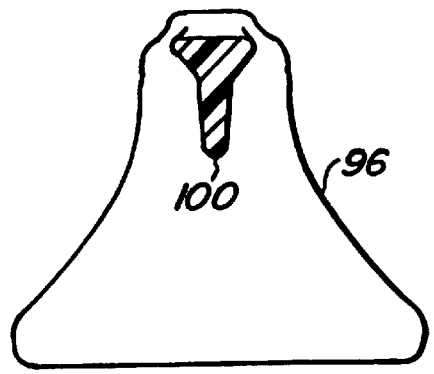
Figure 11:
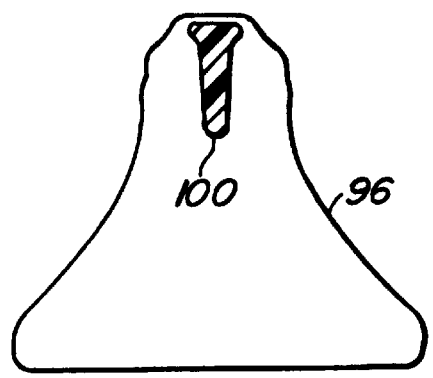
Figure 12:
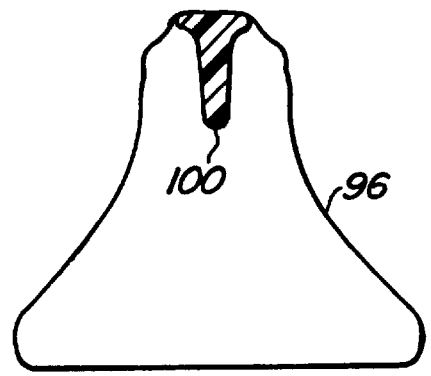
Figure 13:
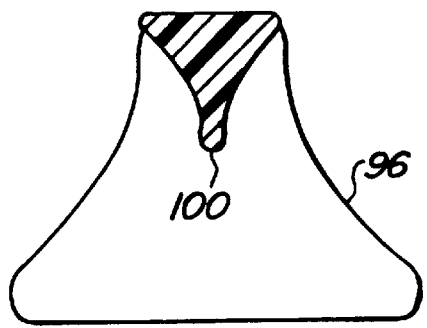
Figure 14:
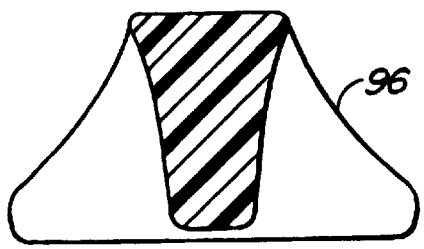

Referring now to FIGS. 1–15, there is shown the preferred embodiment of the present invention. A mulching mower mechanism 10 is provided which includes a mower deck 12 adapted for being suspended or otherwise attached beneath the frame of a lawn tractor (not shown) between the vehicle's front and rear pairs of wheels. The deck 12 includes a top wall 14 and side walls 16. The mower deck 12 is generally completely enclosed and does not provide a discharge outlet through which clippings are expelled. Therefore, clippings cut by the mower blades 18 and 20 recirculate within the deck 12 to be re-cut or mulched by the blades 18 and 20. The clippings are then deposited into the turf. Mulching blades 18 and 20 are utilized to maximize the re-cutting of clippings within the deck 12. The mulching blades 18 and 20 include an outer cutting portion 22 with a leading cutting edge 24 and a trailing upturned wing 26 which creates an updraft as the blade 18 and 20 rotates for suspending clippings within the deck 12. The blades 18 and 20 also include an inner mulching portion 28 with a leading cutting edge 30 and a trailing deflector portion 32 which extends downwardly from the leading cutting edge 30 of the mulching portion 28 for deflecting air and clippings downwardly for directing mulched clippings into the turf.

The mower mechanism 10 includes a drive system 34 which causes the first and second blades 18 and 20 to rotate within the mower deck 12. A conventional belt drive mechanism (not shown) which includes a conventional V-belt 36 is utilized for driving a drive pulley 38. The drive pulley 38 is mounted to a first spindle 40 to which the first or right blade 18 is also mounted. A flexible toothed timing belt 42 engages a first toothed sprocket 44 mounted with the first spindle 40. The toothed belt 42 also engages first and second toothed idlers 46 and 48 mounted to a mounting plate 50. The mounting plate 50 is operatively mounted to the deck 12 by being coupled with the spindle housings 52 and 54 and, more specifically, is captured between the top wall 14 of the deck 12 and the spindle housings 52 and 54. The second toothed idler 48 tensions the toothed belt 42. A second toothed sprocket 56 is drivingly engaged by the toothed belt 42. The second toothed sprocket 56 is fixed with a second spindle 58 to which the second or left blade 20 is mounted. During operation, the V-shaped belt 36 transmits rotational motion to the drive pulley 38. The first spindle 40, first toothed sprocket 44 and first blade 18 rotate with the drive pulley 38. The toothed belt 42 transmits rotational motion from the first toothed sprocket 44 to the second toothed sprocket 56. The second spindle 58 and second blade 20 then rotate with the second toothed sprocket 56. The drive system 34 is configured such that the right spindle 40 and right blade 18 will rotate in a clockwise direction and the left spindle 58 and left blade 20 will rotate in a counterclockwise direction. The right and left blades 18 and 20 are therefore counterrotating.

A tensioning mechanism 60 is supported by the mounting plate 50. The tensioning mechanism 60 includes a bracket 62 to which the second toothed idler 48 is mounted. The second toothed idler 48 is held within a slot formed in the mounting plate 50. A rod 64 having a threaded end portion 66 is received by the bracket 62, and is pivotally mounted to the mounting plate 50. A compression spring 68 is positioned between a portion of the bracket 62 and a washer 70 held in place by a nut 72 threaded on the rod 64. The spring 68 presses against the washer 70 and bracket 62 to press the bracket 62 and second toothed idler 48 in a direction that will place tension in the toothed belt 42. The length of the spring 68 can be adjusted by manipulating the nut 72 on the threaded end portion 66 of the rod 64 to thereby place the proper tension in the toothed belt 42 and for insuring that the toothed belt wraps properly around the various sprockets and idlers. Once the appropriate amount of tension is placed in the toothed belt 42, the second toothed idler 48 can be fixed with respect to the mounting plate 50.

Figure 15:
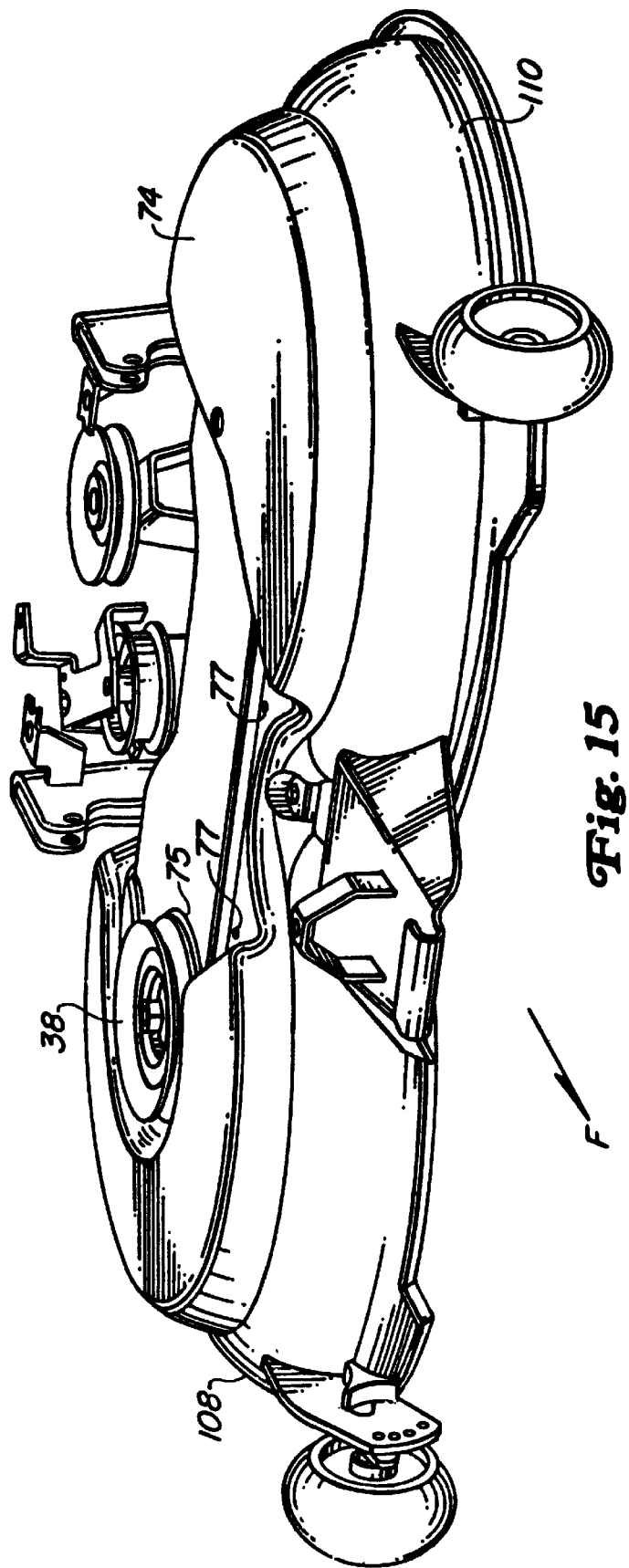
FIG. 15 is a perspective view of the mower deck and cover.

A cover 74, as best seen in FIG. 15, can be attached to the mounting plate 50 and will serve to generally enclose the drive mechanism 34 and generally confine and reduce noise created by the toothed belt drive system 34. The cover 74 also acts as a barrier that helps prevent debris from accumulating on and around the belt drive system 34 and therefore improves the drive system operation. The cover 74 includes an opening 75 through which the drive pulley 38 passes when the cover 74 is being installed on the deck 12. A plurality of attaching bolts 77 secure the cover 74 to the flange portion 79 of the mounting plate 50. By attaching the cover to the mounting plate 50 and not the deck 12, the present invention eliminates attaching hardware that might extend into the interior of the blade chambers 76 and 78.

The mounting plate 50 provides structure for supporting the toothed idlers 46 and 48 and tensioning mechanism 60. Therefore, the toothed idlers 46 and 48 and tensioning mechanism 60 are not coupled directly to the mower deck 12. The attaching hardware which mounts the toothed idlers 46 and 48 and tensioning mechanism 60 to the mounting plate 50 does not protrude through the mower deck 12 to the interior of the blade chambers 76 and 78. The interior of the blade chambers 76 and 78 therefore remains smooth and continuous and does not include any sharp of protruding structures against which clippings can accumulate and clog the deck 12. Effective mowing and mulching is thereby facilitated.

The mounting plate 50 also serves as a stiffener which rigidifies the spindles 40 and 58 as the toothed belt 42 applies forces to the spindles 40 and 58. The mounting plate 50 also helps resist forces encountered when the blades 18 and 20 hit obstructions. These forces are transmitted from the blades 18 and 20 to the spindles 40 and 58 to the spindle housings 52 and 54 and then to the mounting plate 50 and deck 12. The mounting plate 50 helps absorb these forces and generally rigidities the deck 12 and helps prevent the deck 12 from deforming under these loads. Embossments 112 and a flange portion 79 formed integral with the mounting plate 50 help strengthen and rigidify the mounting plate 50. Such embossments 112 or other rigidifying shapes, if formed in the deck itself for rigidifying the deck against loads encountered during operation would establish shapes on the interior of the chambers which would act as structure to which wet and sticky grass clippings would adhere. The mounting plate 50 therefore provides structure in which stiffening shapes 79 and 112 can be formed without adversely affecting the flow of material within the blade chambers 76 and 78. The mounting plate 50 may also help isolate vibrations created by the toothed idlers 46 and 48 and drive system 34.

The attaching hardware that couples the first toothed idler 46 to the mounting plate 50 includes a washer, hex bolt, spacer and locknut washer. The attaching hardware that couples the second toothed idler 48 with the mounting plate 50 includes a spacer, carriage bolt and locknut washer.

Next, the shape of the mower deck 12 according to the present invention will be discussed. The mower deck 12 includes adjacent first and second blade chambers 76 and 78 within which the respective right and left blades 18 and 20 rotate during operation. Each blade chamber 76 and 78 includes a channel 80 which extends around the blade's axis of rotation and spindle 40 or 58. The front, side and rear portions 82, 84 and 86 of the channels 80 extend at a generally constant radius from the spindle 40, 58. The portions 88 of the channels 80 directly between the spindles 40 and 58 extend closer to the spindles 40 and 58 than do the other regions of the channels 80. The channels 80 of the blade chambers 76 and 78 can therefore be described as being D-shaped when viewed from above, with their flatted portions 88 being positioned directly adjacent one another. The flatted portions 88 of the channels 80 helps direct clippings and air inwardly so that they do not flow into or interact with the flow in the other blade chamber 76 or 78.

The rotating blades 18 and 20 operate to cut the growing grass plants near the front portion 82 of the mower deck 12 in the area where the outer cutting portions 22 of the blades 18 and 20 are traveling outwardly away from the centerline of the deck 12. The trailing upturned wing portion 26 generates an updraft within the blade chamber 76 and 78. After the grass has been cut at the front 82 of the chamber 80, the upturned wing 26 lifts the clippings and directs them in the direction of blade rotation. The clippings will thereby be transported through the channel 80 so they can be recut into finer particles by the blade 18, 20. The front portion 82 of the channels 80 are spaced a relatively large distance above the blades 18 and 20 and are relatively tall and narrow for allowing clippings and air to travel a significant distance above the blades 18 and 20. The channels 80 then slope down from the front portion 82 to the lower rear portion 86. The rear portion 86 of each channel 80 is relatively shallow and wide. The low top wall 14 of the rear portion 86 of the channel 80 forces clippings downwardly where they are more likely to interact with the blade 18, 20 for being recut. The lower top wall 14 of the rear portion 86 of the channel 80 also helps allow finely mulched clippings to be directed or drop into the turf since the clippings are closer to the turf in this region of the channel 80. In addition, the rear portion 86 of the channel 80 is relatively wide which allows the clippings to travel radially inwardly where they are more likely to interact with the inner mulching portion 28 of the blade 18, 20 for being recut into smaller particles and directed downwardly into the turf by the trailing downturned wing 32.

A front skirt portion 90 of the mower deck 12 includes a lowermost edge 92 that is somewhat higher than a rear skirt portion 94. The higher front skirt 90 allows clearance for the deck 12 to travel over the growing grass without trampling or bending the grass plants forwardly. The grass plants are therefore in a better position to be lifted by the updraft within the chambers 76 and 78 and are in better position to be cut by the blade 18, 20. Other portions of the sidewalls 16 of the chambers 76 and 78 are lower than the front skirt 90 to help confine clippings within the chambers for recutting.

The blades 18 and 20 of the present invention are counter-rotating, and travel in paths which overlap by approximately two inches. The blade chambers 76 and 78 are positioned directly adjacent one another for allowing the blade paths to overlap in an area between the chambers 76 and 78. A flow divider 96 is fixed as by screws 98 to the top wall 14 of the mower deck 12 in the area between the chambers 76 and 78. The flow divider 96 extends downwardly from the top wall 14 of the mower deck 12 and defines an opening 99 between the blade chambers 76 and 78 and through which the rotating blades 18 and 20 extend. The flow divider 96 defines a lowermost edge 100 which is in relatively close proximity to the top of the rotating blades 18 and 20. The flow divider 96 helps establish a barrier between the two chambers 76 and 78 so that interaction between air and clippings between chambers is minimized. If the flow in the two chambers 76 and 78 were allowed to interact more between the chambers 76 and 78, large clumps of clippings might tend to accumulate in this area. This is because the blades 18 and 20 direct clippings forwardly in the area between the chambers 76 and 78, and may otherwise cause clumps of suspended clippings to accumulate in the front central portion 102 of the deck 12. However, the flow divider 96 tends to prevent the flow in one chamber 76 or 78 from interacting with the flow in the other chamber 76 or 78 and helps direct clippings in a circular motion within the respective chambers 76, 78 so that large clumps tend not to accumulate in the front central region 102 of the deck 12. Furthermore, the flow divider 96 helps break up any large accumulation of clippings in this area 102. Clumps that may accumulate in the region between the chambers tend to be split in half by a forward edge 104 of the flow divider 96 which extends in the vertical dimension. This forward edge 104 helps divide any mass of clippings so that the clippings will be recirculated within the two chambers 76 and 78 and be further dispersed.

The flow divider 96 shown in the drawings is a plastic part that is fixed as by screws 98 to the top wall 14 of the deck 12. The deck 12 is a stamped metal part. Due to the shape of the flow divider 96, it may be difficult and/or costly to form the flow divider 96 as an integral portion of the deck 12 when stamping a piece of sheet metal. Furthermore, forming the shape of the flow divider 96 integral with the deck 12 may make the deck 12 unacceptably weak and susceptible to flexing in the area of the flow divider 96. Therefore, the flow divider 96 is formed as a separate part and assembled to the deck 12. The flow divider 96 shown in the drawings adds rigidity to the deck 12. However, a deck with an integral flow divider could be formed by a stamping process without departing from the spirit of the present invention.

The mulcher mowing mechanism 10 according to the preferred embodiment is designed to eliminate any protrusions within the chambers 76 and 78 to which clippings might adhere. Clogging within the chambers 76 and 78 is thereby minimized even when mowing in wet conditions. The interior surface of the deck 12 is generally smooth and continuous without any sharp corners or structural protrusions against which clippings might stick and accumulate. Very little hardware such as bolts or other fixtures are attached directly to the walls of the deck 12. Idler pulleys of conventional mowers are often mounted directly to the deck. The toothed idlers 46 and 48 according to the present invention are mounted to a mounting plate 50 which extends between the first and second spindles 40 and 58. The mounting plate 50 is fixed with the deck 12 by being confined between the spindle housings 52 and 54 and the top wall 14 of the deck 12. Bolts 106 secure the spindle housing 52 and 54 to the deck 12 and thereby secure the mounting plate 50 in place. The mounting hardware of the toothed idlers 46 and 48 therefore do not protrude through to the interior of the deck 12. Clogging of clippings inside the chambers 76, 78 is thereby reduced due to the smooth and continuous interior surface of the chambers 76, 78 and the lack of structure against which clippings may stick and clog.

The mulching mechanism 10 according to the preferred embodiment provides a right blade 18 which rotates clockwise and a left blade 20 which rotates counterclockwise. The deck 12 is positioned beneath the belly of a lawn tractor such that the right front wheel 114 of the tractor is generally aligned with the outer right portion 108 of the right blade chamber's channel 80, and the left front wheel 116 of the tractor is generally aligned with the outer left portion 110 of the left blade chamber's channel 80, as best seen in FIGS. 3A and 3B. During normal forward operation the front tires 114 and 116 will travel over a strip of turf and generally press or bend the blades of grass forwardly. The outer portions 108 and 110 of the channels 80 will then pass directly over this strip of flattened grass. The upturned wing portion 26 of the cutting blades 18, 20 are travelling rearwardly in this location, such that the draft created by the blade 18, 20 is directed rearwardly and upwardly. The rearwardly and upwardly directed draft is therefore directed in an ideal direction for maximum lifting of the forwardly bent grass plants that have been run over by the front tires 114 and 116.

The paths of the right and left blade 18 and 20 overlap in the area between the chambers 76 and 78, and therefore the grass between the blades 18 and 20 will be properly mowed without leaving an uncut strip of grass between the blades 18 and 20. Therefore, staggering or offsetting the chambers 76 and 78 in a diagonal configuration is not required. The chambers 76 and 78 are positioned directly laterally of one another and therefore are relatively compact for being positioned beneath a relatively small lawn tractor.

Furthermore, this configuration of chambers 76 and 78 allows the operator to easily maneuver the lawn tractor to either the right or left, and allows an operator to mow or trim close to obstructions easily with either side of the deck 12.

What is claimed is:

1. A mower deck within which first and second mower blades rotate for cutting grass, comprising;

first and second blade chambers positioned adjacent each other and within which respective first and second blades rotate during operation, said first and second blade chambers being generally completely enclosed for generally confining grass clippings within the blade chambers without allowing the clippings to exit through side and top walls of the mower deck, wherein said first and second blades travel in respective paths which overlap, wherein said first blade is positioned to the right of the second blade with respect to forward operation of the mower deck and travels in a clockwise direction, and said second blade is positioned to the left of the first blade with respect to forward operation of the mower deck and travels in a counterclockwise direction, a flow divider positioned generally above the location where the blade paths overlap, and defining an opening between the first and second blade chambers at a location where the blade paths overlap, said flow divider includes a partition portion that extends in a vertical dimension downwardly from the top wall of the mower deck to a position in relatively close vertical proximity to the rotating blades in the location where the blade paths overlap, and the partition portion is in close vertical proximity to the rotating blades across the entire horizontal distance of the location where the blade paths overlap, and the flow divider includes a portion directly in front of where the blade paths overlap, said portion serving to divide and direct air and clippings striking the portion to respective blade chambers.

2. The invention of claim 1, wherein said first and second mower blades further comprise mulching blades which include an outer cutting portion having a trailing upturned wing and an inner mulching portion having a trailing portion downwardly extending with respect to a leading portion of the inner mulching portion.

3. The invention of claim 1, wherein said blades chambers each include a channel which is positioned generally above the respective blade and extends around the axis of rotation of the respective blade, said channels being relatively tall near a front portion of the deck and gradually slope down to be relatively shallow near a rear portion of the deck.

4. The invention of claim 1, wherein said blade chambers each include a channel which is positioned generally above the respective blade and extends around the axis of rotation of the respective blade, said channels being relatively narrow near a front portion of the deck and relatively wide near a rear portion of the deck.

5. The invention of claim 1, wherein said blade paths overlap approximately two inches.

6. The invention of claim 1, wherein the deck includes a front skirt portion having a lower edge which is positioned higher than a lower edge of a rear skirt portion.

7. The invention of claim 1, wherein said cutting chambers each include a channel which is positioned generally above the respective blade and extends around the axis of rotation of the respective blade, and a portion of the channel positioned generally between the adjacent blade chambers is positioned closer to its respective blade axis than other portions of the respective channel.

8. The invention of claim 1, wherein said blade chambers each include a channel which is positioned generally above the respective blade and extends around the axis of rotation of the respective blade, said channels, when viewed from a plan view, are D-shaped having generally flattened portions positioned adjacent each other.

9. The invention of claim 1, wherein said mower deck is propelled forwardly by a vehicle having ground engaging left and right wheels positioned in front of the mower deck during operation, said right wheel being generally aligned with an outer portion of the first cutting chamber whereat the first blade travels rearwardly, and said left wheel is generally aligned with an outer portion of the second cutting chamber whereat the second blade travels rearwardly.

10. A mower deck within which first and second mower blades rotate for cutting grass comprising:

first and second blade chambers positioned adjacent each other and within which respective first and second blades rotate during operation, said first and second blade chambers being generally completely enclosed for generally confining grass clippings within the blade chambers without allowing the clippings to exit through side and top walls of the mower deck, wherein said first and second blades travel in respective paths which overlap, wherein said first blade positioned to the right of the second blade with respect to forward operation of the mower deck and travels in a clockwise direction, and said second blade is positioned to the left of the first blade with respect to forward operation of the mower deck and travels in a counterclockwise direction, wherein an opening is formed between the first and second blade chambers at a location where the blade paths overlap, wherein edges of said opening are positioned relatively close to the first and second blades near where the blade paths overlap, wherein said opening is defined by a flow divider positioned generally above the location where the blade paths overlap, said flow divider includes a partition portion extending in a vertical dimension downwardly from the top wall of the mower deck to a position in relatively close vertical proximity to the rotating blades in the location where the blade paths overlap, and the partition portion extends in close vertical proximity to the rotating blades across the entire horizontal distance of the location where the blade paths overlap, and the flow divider includes a portion directly in front of where the blade paths overlap, said portion serving to divide and direct air and clippings striking the portion to respective blade chambers, said blade chambers each include a channel which is positioned generally above the respective blade and extends around the axis of rotation of the respective blade, said channels, when viewed from a plan view, are D-shaped having generally flattened portions positioned adjacent each other, said mower deck is propelled forwardly by a vehicle having ground engaging left and right wheels positioned in front of the mower deck during operation, said right wheel being generally aligned with an outer portion of the first cutting chamber whereat the first blade travels rearwardly, and said left wheel is generally aligned with an outer portion of the second cutting chamber whereat the second blade travels rearwardly.

11. The invention of claim 10, wherein said first and second mower blades further comprise mulching blades which include an outer cutting portion having a trailing upturned wing and an inner mulching portion having a trailing portion downwardly extending from a leading edge of the mulching portion.

12. The invention of claim 10, wherein said blade chambers each include a channel which is positioned generally above the respective blade and extends around the axis of rotation of the respective blade, said channels being relatively tall near a front portion of the deck and gradually slope down to be relatively shallow near a rear portion of the deck.

13. The invention of claim 10, wherein said blade chambers each include a channel which is positioned generally above the respective blade and extends around the axis of rotation of the respective blade, said channels being relatively narrow near a front portion of the deck and relatively wide near a rear portion of the deck.

14. The invention of claim 10, wherein said blade paths overlap approximately two inches.

15. The invention of claim 10, wherein the deck includes a front skirt portion having a lower edge which is positioned higher than a lower edge of a rear skirt portion.

16. A mower deck within which first and second mower blades rotate for cutting grass, comprising:

first and second blade chambers positioned adjacent each other and within which respective first and second blades rotate during operation, said first and second blade chambers being generally completely enclosed for generally confining grass clippings within the blade chambers without allowing the clippings to exit through side and top walls of the mower deck, wherein said first and second blades travel in respective paths which overlap, wherein said first blade is positioned to the right of the second blade with respect to forward operation of the mower deck and travels in a clockwise direction, and said second blade is positioned to the left of the first blade with respect to forward operation of the mower deck and travels in a counterclockwise direction, wherein said blade chambers each include a channel which is positioned generally above the respective blade and extends around the axis of rotation of the respective blade, said channels being relatively tall near a front portion of the deck and gradually slope down to be relatively shallow near a rear portion of the deck.

17. A mower deck within which first and second mower blades rotate for cutting grass, comprising:

first and second blade chambers positioned adjacent each other and within which respective first and second blades rotate during operation, said first and second blade chambers being generally completely enclosed for generally confining grass clippings within the blade chambers without allowing the clippings to exit through side and top walls of the mower deck, wherein said first and second blades travel in respective paths which overlap, wherein said first blade is positioned to the right of the second blade with respect to forward operation of the mower deck and travels in a clockwise direction, and said second blade is positioned to the left of the first blade with respect to forward operation of the mower deck and travels in a counterclockwise direction, and wherein said cutting chambers each include a channel which is positioned generally above the respective blade and extends around the axis of rotation of the respective blade, said channels being relatively narrow near a front portion of the deck and relatively wide near a rear portion of the deck.

18. A mower deck within which first and second mower blades rotate for cutting grass, comprising:

first and second blade chambers positioned adjacent each other and within which respective first and second blades rotate during operation, said first and second blade chambers being generally completely enclosed for generally confining grass clippings within the blade chambers without allowing the clippings to exit through side and top walls of the mower deck, wherein said first and second blades travel in respective paths which overlap, wherein said first blade is positioned to the right of the second blade with respect to forward operation of the mower deck and travels in a clockwise direction, and said second blade is positioned to the left of the first blade with respect to forward operation of the mower deck and travels in a counterclockwise direction, a flow divider positioned generally above the location where the blade paths overlap, and defining an opening between the first and second blade chambers at a location where the blade paths overlap, said flow divider extending downwardly from the top wall of the mower deck to a position in relatively close vertical proximity to the rotating blades in the location where the blade paths overlap, the flow divider includes a portion directly in front of where the blade paths overlap, said portion serving to divide and direct air and clippings striking the portion to respective blade chambers, and wherein said blades chambers each include a channel which is positioned generally above the respective blade and extends around the axis of rotation of the respective blade, said channels being relatively tall near a front portion of the deck and gradually slope down to be relatively shallow near a rear portion of the deck.

19. A mower deck within which first and second mower blades rotate for cutting grass, comprising:

first and second blade chambers positioned adjacent each other and within which respective first and second blades rotate during operation, said first and second blade chambers being generally completely enclosed for generally confining grass clippings within the blade chambers without allowing the clippings to exit through side and top walls of the mower deck, wherein said first and second blades travel in respective paths which overlap, wherein said first blade is positioned to the right of the second blade with respect to forward operation of the mower deck and travels in a clockwise direction, and said second blade is positioned to the left of the first blade with respect to forward operation of the mower deck and travels in a counterclockwise direction, a flow divider positioned generally above the location where the blade paths overlap, and defining an opening between the first and second blade chambers at a location where the blade paths overlap, said flow divider extending downwardly from the top wall of the mower deck to a position in relatively close vertical proximity to the rotating blades in the location where the blade paths overlap, the flow divider includes a portion directly in front of where the blade paths overlap, said portion serving to divide and direct air and clippings striking the portion to respective blade chambers, and wherein said blade chambers each include a channel which is positioned generally above the respective blade and extends around the axis of rotation of the respective blade, said channels being relatively narrow near a front portion of the deck and relatively wide near a rear portion of the deck.

20. A mower deck within which first and second mower blades rotate for cutting grass, comprising:

first and second blade chambers positioned adjacent each other and within which respective first and second blades rotate during operation, said first and second blade chambers being generally completely enclosed for generally confining grass clippings within the blade chambers without allowing the clippings to exit through side and top walls of the mower deck, wherein said first and second blades travel in respective paths which overlap, wherein said first blade is positioned to the right of the second blade with respect to forward operation of the mower deck and travels in a clockwise direction, and said second blade is positioned to the left of the first blade with respect to forward operation of the mower deck and travels in a counterclockwise direction, wherein an opening is formed between the first and second blade chambers at a location where the blade paths overlap, wherein edges of said opening are positioned relatively close to the first and second blades near where the blade paths overlap, wherein said opening is defined by a flow divider positioned generally above the location where the blade paths overlap, said flow divider extending downwardly from the top wall of the mower deck to a position in relatively close vertical proximity to the rotating blades in the location where the blade paths overlap, the flow divider includes a portion directly in front of where the blade paths overlap, said portion serving to divide and direct air and clippings striking the portion to respective blade chambers, said blade chambers each include a channel which is positioned generally above the respective blade and extends around the axis of rotation of the respective blade, said channels, when viewed from a plan view, are D-shaped having generally flattened portions positioned adjacent each other, said mower deck is propelled forwardly by a vehicle having ground engaging left and right wheels positioned in front of the mower deck during operation, said right wheel being generally aligned with an outer portion of the first cutting chamber whereat the first blade travels rearwardly, and said left wheel is generally aligned with an outer portion of the second cutting chamber whereat the second blade travels rearwardly, and wherein said blade chambers each include a channel which is positioned generally above the respective blade and extends around the axis of rotation of the respective blade, said channels being relatively tall near a front portion of the deck and gradually slope down to be relatively shallow near a rear portion of the deck.

21. A mower deck within which first and second mower blades rotate for cutting grass, comprising:

first and second blade chambers positioned adjacent each other and within which respective first and second blades rotate during operation, said first and second blade chambers being generally completely enclosed for generally confining grass clippings within the blade chambers without allowing the clippings to exit through side and top walls of the mower deck, wherein said first and second blades travel in respective paths which overlap, wherein said first blade is positioned to the right of the second blade with respect to forward operation of the mower deck and travels in a clockwise direction, and said second blade is positioned to the left of the first blade with respect to forward operation of the mower deck and travels in a counterclockwise direction, wherein an opening is formed between the first and second blade chambers at a location where the blade paths overlap, wherein edges of said opening are positioned relatively close to the first and second blades near where the blade paths overlap, wherein said opening is defined by a flow divider positioned generally above the location where the blade paths overlap, said flow divider extending downwardly from the top wall of the mower deck to a position in relatively close vertical proximity to the rotating blades in the location where the blade paths overlap, the flow divider includes a portion directly in front of where the blade paths overlap, said portion serving to divide and direct air and clippings striking the portion to respective blade chambers, said blade chambers each include a channel which is positioned generally above the respective blade and extends around the axis of rotation of the respective blade, said channels, when viewed from a plan view, are D-shaped having generally flattened portions positioned adjacent each other, said mower deck is propelled forwardly by a vehicle having ground engaging left and right wheels positioned in front of the mower deck during operation, said right wheel being generally aligned with an outer portion of the first cutting chamber whereat the first blade travels rearwardly, and said left wheel is generally aligned with an outer portion of the second cutting chamber whereat the second blade travels rearwardly, and wherein said blade chambers each include a channel which is positioned generally above the respective blade and extends around the axis of rotation of the respective blade, said channels being relatively narrow near a front portion of the deck and relatively wide near a rear portion of the deck.

* * * * *